(12) United States Patent
Armstrong

(10) Patent No.: US 6,517,134 B2
(45) Date of Patent: Feb. 11, 2003

(54) VEHICLE UTILITY RACK SYSTEM PROVIDING ELEVATED HAULING AND WORKING STATIONS

(76) Inventor: Tommy M. Armstrong, 4798 Kaye Rd., Memphis, TN (US) 38117

( * ) Notice: Subject to any disclaimer, the term of this patent is extended or adjusted under 35 U.S.C. 154(b) by 0 days.

(21) Appl. No.: 09/882,451

(22) Filed: Jun. 14, 2001

(65) Prior Publication Data

US 2002/0190534 A1 Dec. 19, 2002

(51) Int. Cl.[7] .................................................. B60P 3/00
(52) U.S. Cl. ...................... 296/3; 296/26.05; 296/26.06; 296/26.09; 296/26.1; 296/26.11; 224/405; 224/532
(58) Field of Search ........................ 296/3, 26.01, 26.02, 296/26.04, 26.05, 26.06, 26.08, 26.09, 26.1, 26.11; 224/402, 403, 405, 531, 532

(56) References Cited

U.S. PATENT DOCUMENTS

| | | | | |
|---|---|---|---|---|
| 2,508,757 A | * | 5/1950 | Gray | 135/140 |
| 3,893,568 A | * | 7/1975 | Lile | 211/4 |
| 5,096,102 A | * | 3/1992 | Tolson | 224/501 |
| 5,431,472 A | | 7/1995 | Coffland | 296/3 |
| 5,439,152 A | | 8/1995 | Campbell | 224/405 |
| 5,560,666 A | * | 10/1996 | Vieira et al. | 224/402 |
| 5,649,656 A | * | 7/1997 | Davy | 224/405 |
| 5,662,254 A | * | 9/1997 | Lemajeur et al. | 224/405 |
| 5,678,743 A | * | 10/1997 | Johnson et al. | 224/405 |
| 5,752,636 A | * | 5/1998 | Manley | 224/403 |
| 5,938,092 A | * | 8/1999 | Johnson | 224/405 |
| 5,950,890 A | * | 9/1999 | Darby | 224/402 |
| 6,070,926 A | * | 6/2000 | Hardin | 224/518 |
| 6,152,675 A | * | 11/2000 | Compton | 212/299 |
| 6,155,623 A | * | 12/2000 | Lane | 224/405 |

* cited by examiner

*Primary Examiner*—D. Glenn Dayoan
*Assistant Examiner*—Patricia Engle
(74) *Attorney, Agent, or Firm*—Flanagan & Flanagan; John R. Flanagan

(57) ABSTRACT

A vehicle utility rack system includes a pair of single support racks for providing an elevated hauling and working station. Each single support rack includes a T-shaped support structure having a lower vertical member and upper horizontal member, and angular-shaped retention structures disposed adjacent to and connected with opposite lateral end portions of the upper horizontal member so as to extend in an upward direction relative thereto and define opposite outer limits of a horizontal support region on the upper horizontal member. The rack system also includes a dual support rack structure having a single support rack, an auxiliary support rack, and a brace member supporting the auxiliary support rack in a cantilevered fashion from the single support rack and disposing them in spaced apart upright orientations to provide the elevated hauling and working station.

23 Claims, 3 Drawing Sheets

US 6,517,134 B2

VEHICLE UTILITY RACK SYSTEM PROVIDING ELEVATED HAULING AND WORKING STATIONS

BACKGROUND OF THE INVENTION

1. Field of the Invention

The present invention generally relates to rack systems for vehicles and, more particularly, is concerned with an adjustable and detachable vehicle utility rack system that provides elevated hauling and working stations for diverse applications.

2. Description of the Prior Art

Heretofore it has been known to provide a rack system for a vehicle, such as vans, trucks and cars, for carrying items above the roof. Frequently such a rack system is comprised of elongated frame structures which are spaced apart from one another, extend across the roof of the vehicle, and are mounted to the gutters or drip rails of the vehicle along the opposite sides of the roof.

Also it has been known to provide a rack system for a pickup truck comprised of elongated frame structures which are spaced apart from one another and supported on the opposite side walls of the body of the pickup truck. U.S. Pat. No. 5,431,472 to Coffland discloses one such rack system in which the elongated frame structures are supported at forward and rearward locations on the side walls. The frame structures may be pivoted between an upper operative position to a lower inoperative position.

Further it has been known to provide a rack system for a pickup truck comprised of elongated frame structures which are supported upright on the bed of the pickup truck. U.S. Pat. No. 5,439,152 to Campbell discloses one such rack system in which the elongated frame structures are interconnected by a base frame structure.

All of the abovementioned prior art vehicle rack systems may operate satisfactorily under the limited range of conditions for which they were designed. However, none appears to provide a vehicle rack system that adequately addresses the broad range of conditions presented by different vehicles and the wide variety of potential applications for such vehicle rack system.

Consequently, a need exists for an innovation in a vehicle rack system that will overcome the shortcomings of prior art vehicle rack systems without introducing any new problems in place thereof.

SUMMARY OF THE INVENTION

The present invention provides a vehicle utility rack system which satisfies the aforementioned need. The rack system of the present invention provides elevated hauling and working stations for diverse applications. The rack system provides two embodiments which can be used for satisfying the needs of different applications on different vehicles, such as pickup trucks and sports utility vehicles, and also on a trailer towed behind these vehicles. Each of the embodiments of the rack system can be installed, removed and adjusted by one person. The second embodiment of the rack system employs a receiver component of a rear hitch accessory on a vehicle. Both embodiments of the rack system can function either as a hauling or working station. When the rack system is employed as a working station, a sheet of plywood is placed thereon to provide a scaffold platform on which a person can stand.

Accordingly, the present invention is directed to a vehicle utility rack system providing elevated hauling and working stations. There are two exemplary embodiments of the rack system of the present invention disclosed herein.

In a first embodiment, the vehicle utility rack system comprises: (a) a pair of single support racks for together providing the elevated hauling and working station wherein each single support rack includes (i) a support structure being a T-shaped configuration and formed by a lower vertical member and an upper horizontal member defining an upper horizontal support region thereon, and (ii) a pair of retention structures being of an angular-shaped configuration and each disposed adjacent to and connected with one of a pair of opposite lateral end portions of the upper horizontal member of the support structure so as to extend in an upward direction relative thereto and define opposite outer limits of the horizontal support region on the upper horizontal member of the support structure; and (b) means for coupling the lower vertical members of the support structures to portions of a vehicle so as to dispose the single support racks in upright orientations and spaced apart from one another such that the upper horizontal support regions on the support structures provide the elevated hauling and working station of the rack system.

In a second embodiment, the vehicle utility rack system comprises: (a) a dual support rack structure for providing an elevated hauling and working station wherein the dual support rack structure includes (i) a single support rack being of a T-shaped configuration, (ii) an auxiliary support rack being of a T-shaped configuration and shorter in height than the single support rack, and (iii) a brace member extending between and interconnecting the single and auxiliary support racks so as to support the auxiliary support rack in a substantially cantilevered manner from the single support rack and dispose the single and auxiliary support racks in spaced apart upright orientations so as to together provide the elevated hauling and working station; and (b) means for coupling the single support rack to a portion of a vehicle so as to dispose the single and auxiliary support racks in the spaced apart upright orientations.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
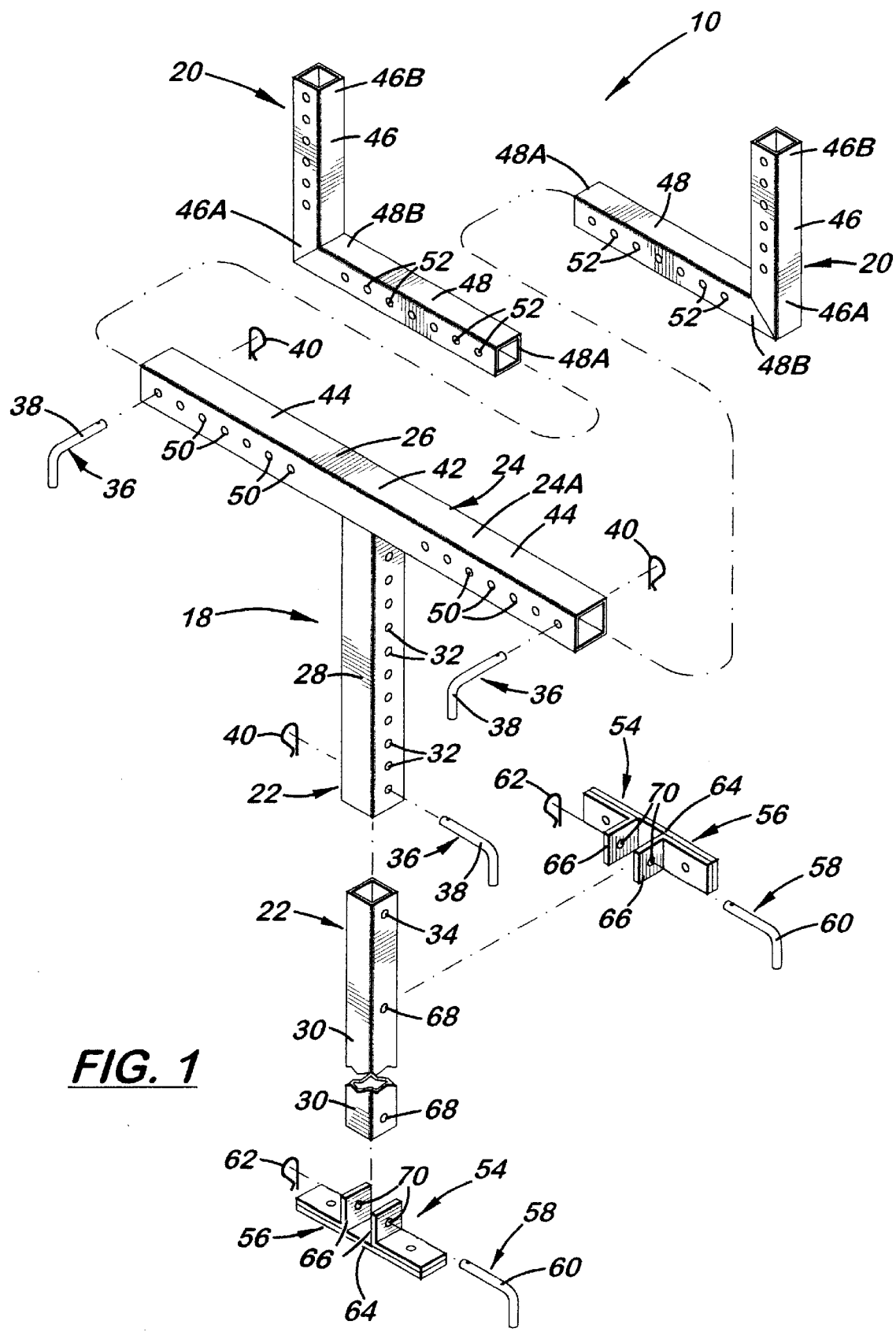
FIG. 1 is an exploded perspective view of a single support rack of the present invention employed in each of two exemplary embodiments of a vehicle utility rack system of the present invention disclosed herein.
Figure 2:
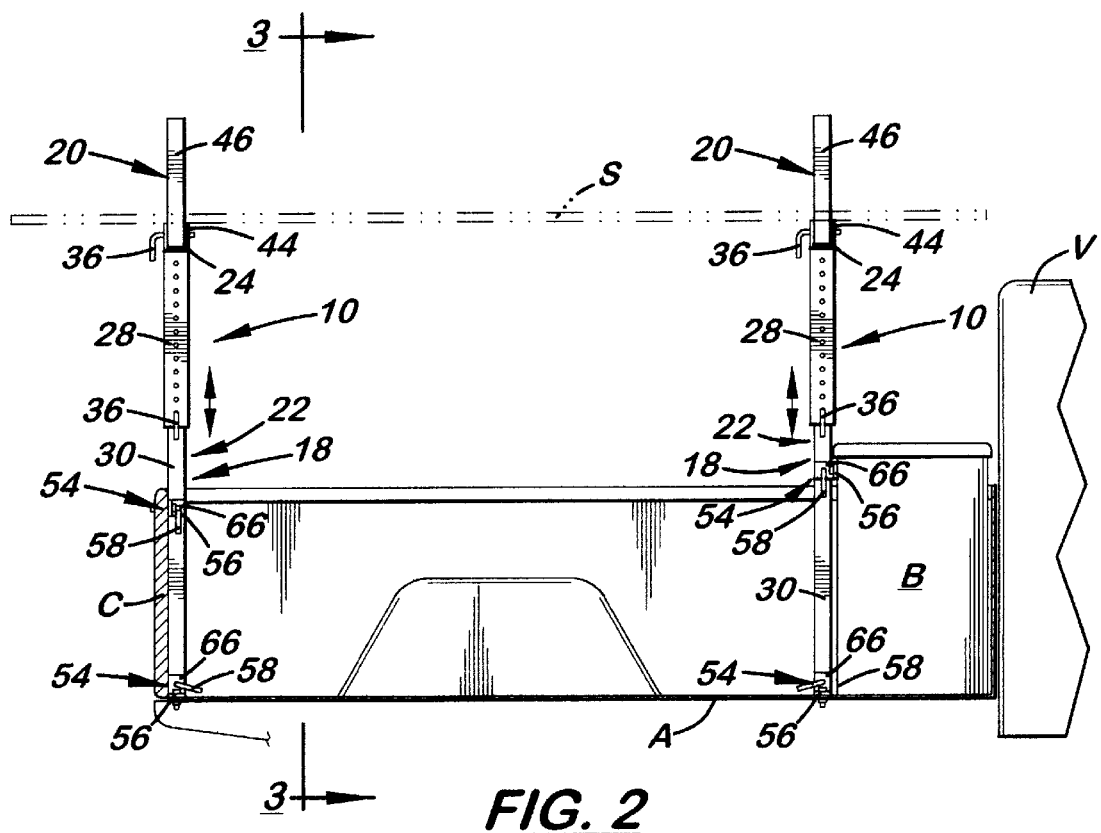
FIG. 2 is a side elevational view of a first embodiment of the rack system wherein a pair of single support racks, together providing an elevated hauling and working station, are shown mounted on a bed of a pickup truck at respective front and rear locations and retained in respective upright operative positions on the truck bed by attachment to a storage box and a tailgate of the truck.
Figure 5:
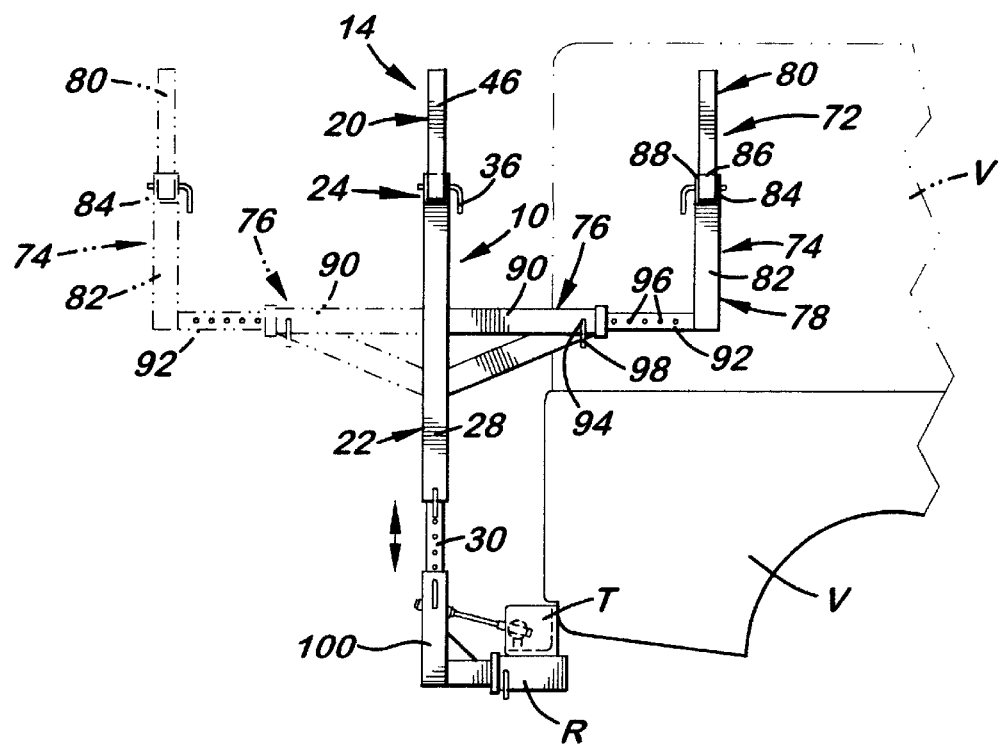
FIG. 5 is a side elevational view of a second embodiment of the rack system wherein a dual support rack structure is shown in two alternative upright operative positions.

Referring to the drawings and particularly to FIGS. 1, 2 and 5, there is illustrated a single support rack, generally designated 10, of the present invention. The support rack 10 is employed in both first and second exemplary embodiments of a vehicle utility rack system, generally designated 12 and 14, of the present invention, as seen respectively in FIGS. 2 and 5.

Figure 3:
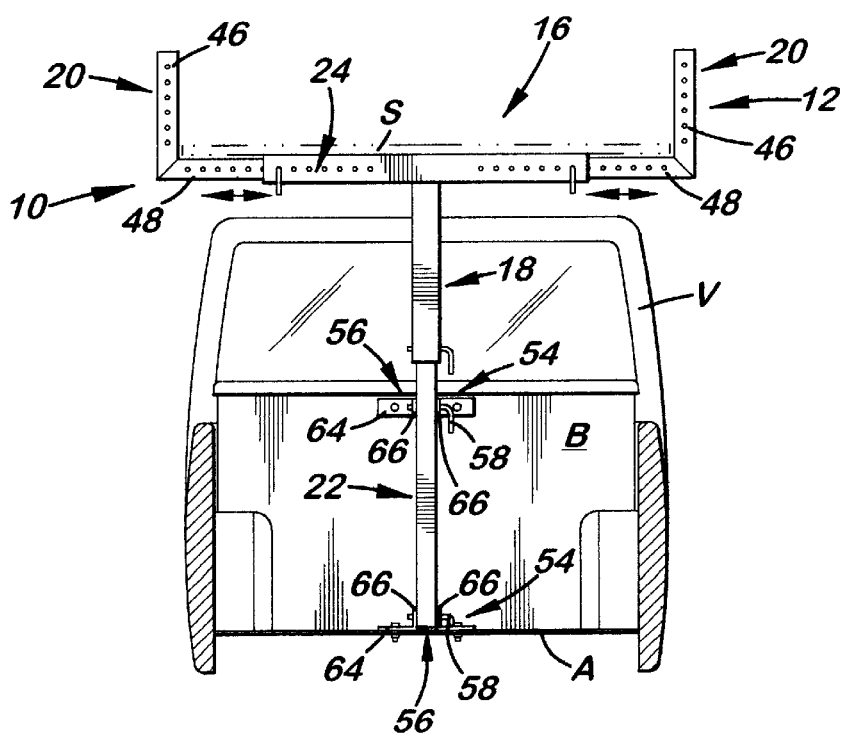
FIG. 3 is a rear elevational view of a front one of the single support racks as seen along line 3—3 of FIG. 2.

Referring to FIGS. 1 to 4, the first embodiment of the utility rack system 12 basically includes a pair of the single support racks 10 for together providing an elevated hauling and working station 16, being represented in FIGS. 2 and 3 by the position of a sheet S of plywood or the like supported across the single support racks 10 which are substantially identical to one another. More particularly, each single support rack 10 includes a support structure 18 and a pair of retention structures 20. The support structure 18 has a generally T-shaped configuration and is formed by a lower vertical member 22 and an upper horizontal member 24 which defines an upper horizontal support region 26 thereon. Each retention structure 20 has an angular, preferably a right-angular, configuration and is disposed adjacent to opposite ends of the upper horizontal member 24 of the support structure 18 as to extend in an upward direction relative thereto and define opposite outer limits of the horizontal support region 26 on the upper horizontal member 24. The support structure and retention structures 18, 20 preferably are constructed from rigid hollow tubes of any suitable material, such as steel or aluminum, with the tubes having rectangular cross-sectional configurations.

The lower vertical member 22 of the support structure 18 preferably has upper and lower portions 28, 30 differing in cross-sectional sizes so as to adapt them to telescopably and slidably interfit with one another permitting lengthwise extension and retraction of the upper and lower portions 28, 30 relative to one another. The upper and lower portions 28, 30 of the lower vertical member 22 also have first and second openings 32, 34 defined therethrough such that a fastener 36, such as in the form of a pin 38 with a cotter key 40, can be removably inserted through aligned ones of the first and second openings 32, 34 so as to releasably secure the upper and lower portions 28, 30 of the lower vertical member 22 together in a selected lengthwise relationship, such as seen in FIGS. 2 and 3.

The upper horizontal member 24 of the support structure 18 is disposed above the upper portion 28 of the lower vertical member 22 of the support structure 18. The upper horizontal member 24 has a middle portion 42 and a pair of opposite lateral end portions 44 integrally connected to and merging from so as to extend in opposite directions from the middle portion 42. The upper horizontal member 24 at the middle portion 42 thereof is rigidly fixed to the lower vertical member 22 at the upper portion 28 thereof such that the lateral end portions 44 of the upper horizontal member 24 extend in opposite directions from the upper portion 28 of the lower vertical member 22. The middle and lateral end portions 42, 44 of the upper horizontal member 24 thus provide an upper surface 24A on the upper horizontal member 24 facing upwardly and away from the lower vertical member 22 which defines the horizontal support region 26 on the support structure 18.

Each retention structure 20 includes an upright member 46 having opposite lower and upper ends 46A, 46B and a transverse member 48 having opposite inner and outer ends 48A, 48B. The transverse member 48 at its outer end 48B is rigidly fixed to the lower end 46A of the upright member 46. Also, the transverse member 48 is interfitted at its inner end 48A with one of the lateral end portions 44 of the upper horizontal member 24 of the support structure 18 such that the upright members 46 of the retention structures 20 are disposed outwardly from the opposite lateral end portions 44 of the upper horizontal member 24 of the support structure 18. The upright members 46 also extend in upward directions relative to the upper horizontal member 24 so as to define the opposite limits of the horizontal support region 26 on the upper surface 24A of the upper horizontal member 24 of the support structure 18. Further, the opposite lateral end portions 44 of the upper horizontal member 24 and the transverse portions 48 of the retention members 20 have first and second openings 50, 52 defined therethrough being alignable such that other of the fasteners 36 can be removably inserted through aligned ones of the first and second openings 50, 52 so as to releasably secure the retention members 20 in selected positions relative to one another outwardly from the opposite lateral end portions 44 of the upper horizontal member 24 of the support structure 18. Upon removal of the fasteners 36 the positions of the retention members 20 can be slidably adjusted relative to the upper horizontal member 24.

Figure 4:
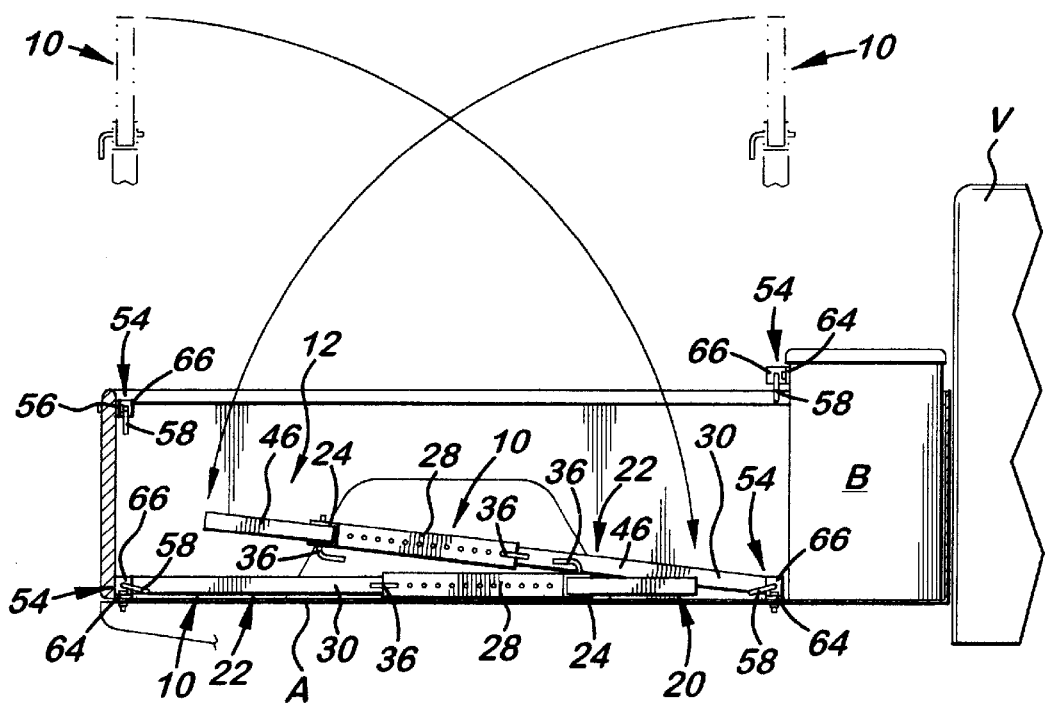
FIG. 4 is a side elevational view similar to that of FIG. 2 but showing the single support racks detached from the storage box and tailgate of the truck and swung down to respective lowered inoperative storage positions on the truck bed.

The first embodiment of the rack assembly 12 depicted in FIGS. 1 to 4 also includes means 54 for coupling the lower vertical member 22 of each support structure 18 to portions A, B and C of a vehicle V, such as a bed A, a storage box B and tailgate C of a pickup V, so as to dispose the single support racks 10 in upright orientations and spaced apart from one another such that the upper horizontal support regions 26 on the support structures 18 provide the elevated hauling and working station 16 of the rack system 12. In the illustrated example, the coupling means 54 includes a pair of lower and upper connector members 56 and a pair of the fasteners 58 (also each being in the form of a pin 60 and cotter key 62). The connector members 56 are adapted for attachment to the vehicle portions, namely the bed A, storage box B and tailgate C, and to interfit with the lower portion 30 of the vertical member 22 of each of the support structures 18 at vertically spaced locations on the lower portion 30 of the vertical member 22. More particularly, each of the lower and upper connector members 56 includes a flat base portion 64 adapted to be attached or fastened to the vehicle portion A, B, C, and a pair of tab portions 66 rigidly attached to and protruding outwardly from one side of the flat base portion 64 and spaced apart so as to receive the lower portion 30 of the lower vertical member 22 therebetween. The lower portion 30 of the lower vertical member 22 and the tab portions 66 of the connector members 56 also have alignable apertures 68, 70 defined therethrough for receiving the fasteners 58 to detachably interconnect the lower vertical member 22 with the upper and lower connector members 56. Respective ones of the fasteners 58 are adapted to interconnect the lower vertical member 22 of each support structure 18 with the upper and lower connector members 56 so as to permit detachably coupling the lower vertical members 22 of the support structures 18 to portions A, B, C of the vehicle V in order to dispose the support racks 10 in a raised upright operative orientation, as seen in FIGS. 2 and 3, while also permitting swinging of the support racks 10 to an lowered inoperative orientation, as seen in FIG. 4, or also permitting detachment and removal of the support racks 10 from the bed A of the pickup truck V.

Referring now to FIG. 5, the second embodiment of the utility rack system 14 basically includes the dual support rack structure 72 for providing the elevated hauling and working station 16. The dual support rack structure 72 includes one single support rack 10 as described above, an auxiliary support rack 74 being of a T-shaped configuration and shorter in height than the single support rack 10, and a brace member 76 extending between and interconnecting the single and auxiliary support racks 10, 74 so as to support the auxiliary support rack 74 in a substantially cantilevered manner from the single support rack 10 and dispose the single and auxiliary support racks 10, 74 in spaced apart upright orientations so as to together provide the elevated hauling and working station 16. The single support rack 10 of the dual support rack structure 74 has the same construction as that described above and thus the same reference numbers are used to identified the same parts.

The auxiliary single support rack 74 includes an auxiliary support structure 78 and a pair of auxiliary retention structures 80. The auxiliary support structure 78 has a T-shaped configuration and is formed by an auxiliary lower vertical member 82 and an auxiliary upper horizontal member 84 defining an upper horizontal support region 86 thereon. As can be readily observed in FIG. 5, the auxiliary lower vertical member 82 is substantially shorter in length than the lower vertical member 22 of the support structure 18 of the single support rack 10. Each auxiliary retention structure 80 has an angular-shaped configuration and is disposed adjacent to and fitted with one of a pair of opposite lateral end portions 88 of the auxiliary upper horizontal member 84 of the auxiliary support structure 78 so as to extend in an upward direction relative thereto so as to define opposite outer limits of the horizontal support region 86 defined by the auxiliary upper horizontal member 84. The auxiliary retention structures 80 are adjustable toward and away from the auxiliary upper horizontal member 84 is the same manner as the retention structures 20 are adjustable toward and away from the upper horizontal member 24 as described earlier.

The brace member 76 extends between and interconnects the lower vertical members 22, 82 of the single and auxiliary support racks 10, 74 so as to dispose said single and auxiliary support racks 10, 74 in the spaced apart upright orientations. The brace member 76 includes inner and outer portions 90, 92 adapted to telescopably and slidably interfit with one another so as to permit lengthwise extension and retraction of the brace member 76 and thus displacement of the single and auxiliary support racks 10, 74 relative to one another. The inner and outer portions 90, 92 also having first and second openings 94, 96 therethrough such that a fastener 98 can be removably inserted through aligned ones of the first and second openings so as to releasably secure the inner and outer portions 90, 92 of the brace member together in a selected lengthwise relationship.

The second embodiment of the rack assembly 14 depicted in FIG. 5 also includes means 100 for coupling the single support rack 10 to a portion of a vehicle so as to dispose the single and auxiliary support racks 10, 74 in the spaced apart upright orientations. The coupling means 100 is a right-angled bracket holder adapted to support the single support rack 10 in the upright orientation and to interfit with a receiver R of a rear towing implement T of the vehicle V, such as a sports utility vehicle, a pickup truck or the like. It can be understood in FIG. 5, that the orientation of the dual support rack structure 72 rotated 180 degrees such that the auxiliary support rack 74 can extend rearwardly from the vehicle V or inside the rear of the vehicle.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A vehicle utility rack system, comprising:
    (a) a pair of single support racks for together providing an elevated hauling and working station, each of said single support racks including
        (i) a support structure being of a T-shaped configuration and formed by a lower vertical member and an upper horizontal member defining an upper horizontal support region thereon, and
        (ii) a pair of retention structures being of an angular-shaped configuration and each disposed adjacent to and connected with one of a pair of opposite lateral end portions of said upper horizontal member of said support structure so as to extend in an upward direction relative thereto and define opposite outer limits of said horizontal support region on said upper horizontal member of said support structure; and
    (b) means for coupling said lower vertical members of said support structures to portions of a vehicle so as to dispose said single support racks in upright orientations and spaced apart from one another such that said upper horizontal support regions on said support structures provide said elevated hauling and working station of said utility rack system, said means for coupling including
        (i) a pair of lower and upper connector members adapted for attachment to the vehicle portions and to interfit with said lower vertical member of each of said support structures at vertically spaced locations on said lower vertical member, and
        (ii) a pair of fasteners each adapted to detachably interconnect said lower vertical member of each of said support structures with one of said lower and upper connector members.

2. The rack system of claim 1 wherein said single support racks are substantially identical to one another.

3. The rack system of claim 1 wherein each of said lower and upper connector members includes a flat base portion adapted for attachment to the vehicle portion and a pair of tab portions rigidly attached to and protruding outwardly from one side of said flat base portion and spaced apart so as to receive said lower vertical member therebetween, said lower vertical member and said tab portions of said connector members having alignable apertures for receiving said fasteners therethrough to detachably interconnect said lower vertical member with said connector members.

4. The rack system of claim 1 wherein said upper horizontal member of said support structure of each of said single support racks is disposed above said lower vertical member thereof and has a middle portion and said pair of opposite lateral end portions extending in opposite directions from said middle portion, said upper horizontal member at said middle portion thereof being rigidly fixed to said lower vertical member such that said lateral end portions of said upper horizontal member extend in opposite directions from said lower vertical member and said middle and lateral end portions of said upper horizontal member provide an upper surface on said upper horizontal member facing upwardly and away from said lower vertical member which defines said horizontal support region on said support structure.

5. The rack system of claim 4 wherein each of said retention structures includes an upright member having opposite lower and upper ends and a transverse member having opposite inner and outer ends and being rigidly fixed at said outer end thereof to said lower end of said upright member and interfitted at said inner end thereof with one of said lateral end portions of said upper horizontal member of said support structure such that said upright members of said retention structures are disposed outwardly from said opposite lateral end portions of said upper horizontal member of said support structure and extend in upward directions relative thereto so as to define said opposite limits of said horizontal support region on said upper surface of said upper horizontal member of said support structure.

6. The rack system of claim 5 wherein said opposite lateral end portions of said upper horizontal member of said support structure and said transverse portions of said retention members have first and second openings therethrough being alignable such that fasteners can be removably inserted through aligned ones of said first and second openings so as to releasably secure said retention members in selected positions relative to one another outwardly from said opposite lateral end portions of said upper horizontal member of said support structure.

7. The rack system of claim 1 wherein said lower vertical member of said support structure of each of said single support racks has upper and lower portions being adapted to telescopably and slidably interfit with one another so as to permit lengthwise extension and retraction of said upper and lower portions of said lower vertical member relative to one another.

8. The rack system of claim 7 wherein said upper and lower portions of said lower vertical member of said support structure of each of said single support racks have first and second openings therethrough such that a fastener can be removably inserted through aligned ones of said first and second openings so as to releasably secure said upper and lower portions of said lower vertical member together in a selected lengthwise relationship.

9. The rack system of claim 8 wherein said upper horizontal member of said support structure of each of said single support racks is disposed above said upper portion of said lower vertical member thereof and has a middle portion and said pair of opposite lateral end portions extending in opposite directions from said middle portion, said upper horizontal member at said middle portion thereof being rigidly fixed to said lower vertical member at said upper portion thereof such that said lateral end portions of said upper horizontal member extend in opposite directions from said upper portion of said lower vertical member and said middle and lateral end portions of said upper horizontal member provide an upper surface on said upper horizontal member facing upwardly and away from said lower vertical member which defines said horizontal support region on said support structure.

10. The rack system of claim 9 wherein each of said retention structures includes an upright member having opposite lower and upper ends and a transverse member having opposite inner and outer ends and being rigidly fixed at said outer end thereof to said lower end of said upright member and interfitted at said inner end thereof with one of said lateral end portions of said upper horizontal member of said support structure such that said upright members of said retention structures are disposed outwardly from said opposite lateral end portions of said upper horizontal member of said support structure and extend in upward directions relative thereto so as to define said opposite limits of said horizontal support region on said upper surface of said upper horizontal member of said support structure.

11. The rack system of claim 10 wherein said opposite lateral end portions of said upper horizontal member of said support structure and said transverse portions of said retention members have first and second openings therethrough being alignable such that fasteners can be removably inserted through aligned ones of said first and second openings so as to releasably secure said retention members in selected positions relative to one another outwardly from said opposite lateral end portions of said upper horizontal member of said support structure.

12. A vehicle utility rack system, comprising:
  (a) a dual support rack structure for providing an elevated hauling and working station, said dual support rack structure including
    (i) a single support rack being of a T-shaped configuration,
    (ii) an auxiliary support rack being of a T-shaped configuration and shorter in height than said single support rack, and
    (iii) a brace member extending between and interconnecting said single and auxiliary support racks so as to support said auxiliary support rack in a substantially cantilevered manner from said single support rack and dispose said single and auxiliary support racks in spaced apart upright orientations so as to together provide said elevated hauling and working station; and
  (b) means for coupling said single support rack to a portion of a vehicle so as to dispose said single and auxiliary support racks of said dual support rack structure in said spaced apart upright orientations.

13. The rack system of claim 12 wherein said coupling means is a right angled bracket holder adapted to support said single support rack in said upright orientation and to interfit with a receiver of a rear towing implement of a vehicle.

14. The rack system of claim 12 wherein said single support rack includes:
  a support structure being of said T-shaped configuration and formed by a lower vertical member and an upper horizontal member defining an upper horizontal support region thereon; and
  a pair of retention structures being of an angular-shaped configuration and each disposed adjacent to and fitted with one of a pair of opposite lateral end portions of said upper horizontal member of said support structure so as to extend in an upward direction relative thereto and define opposite outer limits of said horizontal support region defined on said upper horizontal member of said support structure.

15. The rack system of claim 14 wherein said auxiliary single support rack includes:
  an auxiliary support structure being of said T-shaped configuration and formed by an auxiliary lower vertical member and an auxiliary upper horizontal member defining an upper horizontal support region thereon, said auxiliary lower vertical member being shorter in length than said lower vertical member of said support structure of said single support rack; and
  pair of auxiliary retention structures each being of an angular-shaped configuration and disposed adjacent to and fitted with one of a pair of opposite lateral end portions of said auxiliary upper horizontal member of said auxiliary support structure so as to extend in an upward direction relative thereto so as to define opposite outer limits of said horizontal support region defined by said auxiliary upper horizontal member of said auxiliary support structure.

16. The rack system of claim 15 wherein said brace member extends between and interconnects said lower vertical members of said single and auxiliary support racks so as to dispose said single and auxiliary support racks in said spaced apart upright orientations.

17. The rack system of claim 14 wherein said vertical member of said support structure of said single support rack has upper and lower portions adapted to telescopably and slidably interfit with one another so as to permit lengthwise extension and retraction of said upper and lower portions relative to one another, said upper and lower portions also having first and second openings therethrough such that a fastener can be removably inserted through aligned ones of said first and second openings so as to releasably secure said upper and lower portions together in a selected one lengthwise relationship.

18. The rack system of claim 12 wherein said brace member includes inner and outer portions adapted to telescopably and slidably interfit with one another so as to permit lengthwise extension and retraction of said brace member and thus displacement of said single and auxiliary support racks relative to one another, said inner and outer portions also having first and second openings therethrough such that a fastener can be removably inserted through aligned ones of said first and second openings so as to releasably secure said inner and outer portions of said brace member together in a selected lengthwise relationship.

19. A support rack for a vehicle utility rack system, support rack comprising:

(a) a support structure being of a T-shaped configuration and including an elongated lower vertical member having opposite upper and lower portions and an elongated upper horizontal member disposed above said lower vertical member and having a middle portion and a pair of opposite lateral end portions extending in opposite directions from said middle portion, said upper horizontal member at said middle portion thereof being rigidly fixed to said lower vertical member at said upper portion thereof such that said lateral end portions of said upper horizontal member extend in opposite directions from said upper portion of said lower vertical member and said middle and lateral end portions of said upper horizontal member provide an upper surface on said upper horizontal member facing upwardly and away from said lower vertical member which defines a horizontal support station on said support structure;

(b) a pair of retention structures each being of an angular-shaped configuration and including an upright member having opposite lower and upper ends and a transverse member having opposite inner and outer ends and being rigidly fixed at said outer end thereof to said lower end of said upright member and interfitted at said inner end thereof with one of said lateral end portions of said upper horizontal member of said support structure such that said upright members of said retention structures are disposed outwardly from said opposite lateral end portions of said upper horizontal member of said support structure and extend in upward directions relative thereto so as to define opposite limits of said horizontal support region on said upper surface of said upper horizontal member of said support structure; and (c) means for detachably coupling said lower vertical member of said support structure to portions of a vehicle so as to dispose said support rack in a raised upright operative orientation while permitting swinging of said support rack to an lowered inoperative orientation, said means for detachably coupling including
  (i) a pair of lower and upper connector members adapted for attachment to the vehicle portions and to interfit with said lower vertical member of one of said support structures at vertically spaced locations on said lower vertical member, and
  (ii) a pair of fasteners adapted to detachably interconnect said lower vertical member of said support structure with said lower and upper connector members.

20. The support rack of claim 19 wherein each of said lower and upper connector members includes a flat base portion adapted for attachment to one of the vehicle portions and a pair of tab portions rigidly attached to and protruding outwardly from one side of said flat base portion and spaced apart so as to receive said lower vertical member therebetween, said lower vertical member and said tab portions of said connector members having alignable apertures for receiving said fasteners therethrough to detachably interconnect said lower vertical member with said connector members.

21. The support rack of claim 19 wherein said upper and lower portions of said lower vertical member are adapted to telescopably and slidably interfit with one another so as to permit lengthwise extension and retraction of said upper and lower portions of said lower vertical member relative to one another.

22. The support rack of claim 21 wherein said upper and lower portions of said lower vertical member have first and second openings therethrough such that a fastener can be removably inserted through aligned ones of said first and second openings so as to releasably secure said upper and lower portions of said lower vertical member together in a selected one lengthwise relationship.

23. The support rack of claim 19 wherein said opposite lateral end portions of said upper horizontal member of said support structure and said transverse portions of said retention members have first and second openings therethrough being alignable such that fasteners can be removably inserted through aligned ones of said first and second openings so as to releasably secure said retention members in selected positions relative to one another outwardly from said opposite lateral end portions of said upper horizontal member of said support structure.

* * * * *